United States Patent
Liu et al.

(10) Patent No.: US 12,004,207 B2
(45) Date of Patent: Jun. 4, 2024

(54) METHOD, DEVICE, AND SYSTEM FOR NOTIFYING INFORMATION ABOUT POWER DIFFERENCE

(71) Applicant: HUAWEI TECHNOLOGIES CO., LTD., Guangdong (CN)

(72) Inventors: Fengwei Liu, Chengdu (CN); Lei Chen, Shenzhen (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 17/332,515

(22) Filed: May 27, 2021

(65) Prior Publication Data
US 2021/0289508 A1 Sep. 16, 2021

Related U.S. Application Data

(63) Continuation of application No. PCT/CN2019/120927, filed on Nov. 26, 2019.

(30) Foreign Application Priority Data

Nov. 29, 2018 (CN) .......................... 201811446569.5

(51) Int. Cl.
*H04W 72/00* (2023.01)
*H04B 7/06* (2006.01)
*H04W 72/54* (2023.01)

(52) U.S. Cl.
CPC .......... *H04W 72/54* (2023.01); *H04B 7/0626* (2013.01)

(58) Field of Classification Search
None
See application file for complete search history.

(56) References Cited

U.S. PATENT DOCUMENTS

2012/0238313 A1 9/2012 Zhou et al.
2015/0349933 A1 12/2015 Davydov et al.
(Continued)

FOREIGN PATENT DOCUMENTS

CN 103327599 A 9/2013
CN 104285465 A 1/2015
(Continued)

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.

(Continued)

*Primary Examiner* — Scott M Sciacca
(74) *Attorney, Agent, or Firm* — Fish & Richardson P.C.

(57) ABSTRACT

Embodiments of the present disclosure disclose example network device, terminal device, and method for notifying information about a power difference. One example network device includes one or more processors performing operations that include determining first information and sending, by a transceiver of the network device, the first information to a terminal device. The first information indicates a first power difference that is associated with a first waveform. The first power difference is an offset between a power of a reference signal and a power of a first physical downlink shared channel (PDSCH) on which the first waveform is used.

20 Claims, 6 Drawing Sheets

(56) References Cited

U.S. PATENT DOCUMENTS

2018/0287840 A1* 10/2018 Akkarakaran ........ H04L 27/262
2019/0364546 A1* 11/2019 Kwak .................. H04L 5/0044

FOREIGN PATENT DOCUMENTS

| CN | 107567694 A | 1/2018 |
|---|---|---|
| WO | 2015071535 A1 | 5/2015 |
| WO | 2016208350 A1 | 12/2016 |

OTHER PUBLICATIONS

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.

PCT International Search Report and Written Opinion in International Application No. PCT/CN2019/120927, dated Feb. 17, 2020, 17 pages.

Ericsson, "On PAPR issue for DMRS," 3GPP TSG RAN WG1 Meeting #94, R1-1809213, Göteborg, Sweden, Aug. 20-24, 2018, 11 pages.

Ericsson, "Why PAPR is important for CP-OFDM," 3GPP TSG RAN WG1 Meeting #94, R1-1809211, Göteborg, Sweden, Aug. 20-24, 2018, 4 pages.

Extended European Search Report issued in European Application No. 19888894.3 dated Nov. 12, 2021, 12 pages.

New Postcom, "Performance evaluation of FeICIC with reduced power in ABS," 3GPP TSG RAN WG1 Meeting #67, R1-113704, San Francisco, USA, Nov. 14-18, 2011, 4 pages.

Vivo, "Draft CR on reference signals and QCL," 3GPP TSG RAN WG1 Meeting #95, R1-1812286, Spokane, USA, Nov. 12-16, 2018, 4 pages.

Office Action issued in Chinese Application No. 201811446569.5 dated Nov. 26, 2021, 17 pages (with English translation).

* cited by examiner

METHOD, DEVICE, AND SYSTEM FOR NOTIFYING INFORMATION ABOUT POWER DIFFERENCE

CROSS-REFERENCE TO RELATED APPLICATIONS

This application is a continuation of International Application No. PCT/CN2019/120927, filed on Nov. 26, 2019, which claims priority to Chinese Patent Application No. 201811446569.5, filed on Nov. 29, 2018. The disclosures of the aforementioned applications are hereby incorporated by reference in their entireties.

TECHNICAL FIELD

This application relates to the field of communications technologies, and in particular, to a method, device, and system for notifying information about a power difference.

BACKGROUND

In a frequency band below 52.6 GHz, in new radio (NR), an orthogonal frequency division multiplexing (OFDM) waveform is used in a downlink, and an OFDM waveform and a discrete Fourier transform spread orthogonal frequency division multiplexing (DFT-s-OFDM) waveform are used in an uplink.

During downlink transmission, a network device sends channel state information-reference signal (CSI-RS) resource configuration information and channel state information (CSI) reporting configuration information to a terminal device. The terminal device performs CSI-RS measurement based on the CSI-RS resource configuration information and the CSI reporting configuration information to obtain CSI, and sends the CSI to the network device on a PUCCH or a PUSCH. The network device determines downlink scheduling based on the CSI reported by the terminal device, for example, a precoding matrix indicator (PMI), a quantity of MIMO streams, or a modulation and coding scheme (MCS). The CSI includes channel quality information (CQI). The terminal device feeds back a CQI index to the network device, and the network device transmits data to the terminal device by using an MCS corresponding to the CQI index. Different CQI indexes may correspond to different modulation schemes, for example, quadrature phase shift keying (QPSK), 16QAM, 64QAM, and 256QAM.

The OFDM waveform has the following advantages: flexible frequency division multiplexing, good compatibility with a multiple-input multiple-output (MIMO) technology, good link performance on a frequency-selective channel, and the like. However, the OFDM waveform has a relatively high peak-to-average power ratio (PAPR), and needs to work in a linear range of a power amplifier. A PAPR of the DFT-s-OFDM waveform is significantly lower than that of the OFDM waveform. With a same power amplifier, the DFT-s-OFDM waveform has a higher output power. Therefore, the DFT-s-OFDM waveform may be used to improve an uplink coverage. However, performance of the DFT-s-OFDM waveform on the frequency-selective channel is worse than that of the OFDM waveform. The DFT-s-OFDM waveform and the OFDM waveform have good compatibility. In a frequency band above 52.6 GHz (high frequency), a performance advantage of the OFDM waveform is reduced, and the DFT-s-OFDM waveform may be used more widely. In a high-frequency scenario, the DFT-s-OFDM waveform may also be used for downlink transmission. Another single-carrier waveform may also be applied to downlink transmission.

The single-carrier waveform is different from the OFDM waveform. Therefore, when the single-carrier waveform is used for downlink transmission, a method for notifying information about a power difference needs to be provided, to ensure accuracy of the CSI reported by the terminal device or accuracy of demodulation of a downlink data channel.

SUMMARY

To ensure accuracy of CSI reported by a terminal device, or to enable a terminal device to demodulate a downlink data channel more accurately, embodiments of this application provide a method for notifying information about a power difference. The embodiments of this application further provide a corresponding device, a chip system, a computer-readable storage medium, and a signal transmission system.

According to a first aspect, a method for notifying information about a power difference is provided, and includes: A network device determines first information. The first information is used to indicate a first power difference, the first power difference is related to a first waveform, and the first power difference is an offset between a reference signal and a power of a first physical downlink shared channel (PDSCH) on which the first waveform is used. The network device sends the first information to a terminal device.

Optionally, the first waveform includes a single-carrier waveform or a multi-carrier waveform.

Optionally, if the first waveform is the single-carrier waveform, the first power difference is related to the first waveform and a first modulation scheme, and the first power difference is an offset between the power of the reference signal and the power of the first physical downlink shared channel (PDSCH) on which the first waveform and the first modulation scheme are used.

Optionally, the first information indicates a plurality of first power differences, and at least two of the plurality of first power differences correspond to different waveforms. Optionally, the method further includes: The network device sends second information to the terminal device. The second information is used to indicate waveform information corresponding to channel state information (CSI) that needs to be reported by the terminal device. CSI that is to be sent by the terminal device and that is to be received by the network device is CSI corresponding to the waveform information indicated by the second information.

Optionally, the method further includes: The network device receives request information sent by the terminal device, and the network device sends the second information to the terminal device. The request information is used to request the network device to indicate the waveform information corresponding to the CSI that needs to be reported by the terminal device.

Optionally, the method further includes: The network device receives third information sent by the terminal device. The third information is used to indicate waveform information corresponding to CSI to be reported by the terminal device.

Optionally, the method further includes: If the reference signal is a channel state information reference signal, the network device receives the CSI sent by the terminal device. The CSI is determined based on the first power difference.

Optionally, the method further includes: If the reference signal is a DMRS, the network device performs downlink transmission based on the first power difference.

According to a second aspect, a method for notifying information about a power difference is provided, and includes: A terminal device receives first information sent by a network device, where the first information is used to indicate a first power difference, the first power difference is related to a first waveform, and the first power difference is an offset between a power of a reference signal and a power of a first physical downlink shared channel (PDSCH) on which the first waveform is used. The terminal device obtains the first power difference.

Optionally, the first waveform includes a single-carrier waveform or a multi-carrier waveform.

Optionally, if the first waveform is the single-carrier waveform, the first power difference is related to the first waveform and a first modulation scheme, and the first power difference is an offset between the power of the reference signal and the power of the first physical downlink shared channel (PDSCH) on which the first waveform and the first modulation scheme are used.

Optionally, the first information indicates a plurality of first power differences, and at least two of the plurality of first power differences correspond to different waveforms.

Optionally, the method further includes: receiving second information sent by the network device. The second information is used to indicate waveform information corresponding to CSI that needs to be reported by the terminal device. CSI that is to be sent by the terminal device to the network device is CSI corresponding to the waveform information indicated by the second information.

Optionally, the method further includes: The terminal device sends request information to the network device, and the terminal device receives the second information sent by the network device.

Optionally, the method further includes: The terminal device sends third information to the network device. The third information is used to indicate waveform information corresponding to CSI to be reported by the terminal device.

Optionally, the method further includes: If the reference signal is a channel state information reference signal, the terminal device determines the CSI based on the first power difference, and the terminal device sends the CSI to the network device. Optionally, the method further includes: If the reference signal is a DMRS, the terminal device receives, based on the first power difference, downlink transmission performed by the network device.

Optionally, with reference to the first aspect and the second aspect, the first information includes information about the first power difference.

Optionally, with reference to the first aspect and the second aspect, the first information includes information about a second power difference and information about a third power difference, the second power difference is related to a second waveform, the second power difference is an offset between the power of the reference signal and a power of a second PDSCH on which the second waveform is used, the third power difference is an offset between the power of the first PDSCH and the power of the second PDSCH, and the first power difference is determined based on the second power difference and the third power difference. Optionally, the information about the second power difference and the information about the third power difference may be carried in a same message, or may be carried in different messages.

Optionally, with reference to the first aspect and the second aspect, the first information includes information about a second power difference, the second power difference is related to a second waveform, the second power difference is an offset between the power of the reference signal and a power of a second PDSCH on which the second waveform is used, the first power difference is determined based on the second power difference and a third power difference, and the third power difference is an offset between the power of the first PDSCH and the power of the second PDSCH. Optionally, the third power difference is preset.

Optionally, the second waveform includes a single-carrier waveform or a multi-carrier waveform. The first waveform and the second waveform may be the same or different.

Optionally, with reference to the first aspect and the second aspect, the first information includes information about a fourth power difference and information about a fifth power difference, the fourth power difference is related to the first waveform and a second modulation scheme, the fourth power difference is an offset between the power of the reference signal and a power of a third physical downlink shared channel (PDSCH) on which the first waveform and the second modulation scheme are used, the fifth power difference is an offset between the power of the first PDSCH and the power of the third PDSCH, and the first power difference is determined based on the fourth power difference and the fifth power difference. Optionally, the information about the fourth power difference and the information about the fifth power difference may be carried in a same message, or may be carried in different messages.

Optionally, with reference to the first aspect and the second aspect, the first information includes information about a fourth power difference, the fourth power difference is related to the first waveform and a second modulation scheme, the fourth power difference is an offset between the power of the reference signal and a power of a third physical downlink shared channel (PDSCH) on which the first waveform and the second modulation scheme are used, the first power difference is determined based on the fourth power difference and a fifth power difference, and the fifth power difference is an offset between the power of the first PDSCH and the power of the third PDSCH. Optionally, the fifth power difference is preset.

According to a third aspect, a network device is provided, and includes: a processing unit, configured to determine first information, where the first information is used to indicate a first power difference, the first power difference is related to a first waveform, and the first power difference is an offset between a power of a reference signal and a power of a first physical downlink shared channel (PDSCH) on which the first waveform is used; and a communications unit, configured to send the first information to a terminal device.

Optionally, the communications unit is further configured to send second information to the terminal device. The second information is used to indicate waveform information corresponding to channel state information (CSI) that needs to be reported by the terminal device.

Optionally, the communications unit is further configured to: receive request information sent by the terminal device, and send the second information to the terminal device. The request information is used to request the network device to indicate the waveform information corresponding to the CSI that needs to be reported by the terminal device. Optionally, the communications unit is further configured to receive third information sent by the terminal device. The third information is used to indicate waveform information corresponding to CSI to be reported by the terminal device.

Optionally, if the reference signal is a channel state information reference signal, the communications unit is further configured to receive the CSI sent by the terminal device. The CSI is determined based on the first power difference.

Optionally, if the reference signal is a DMRS, the communications unit is configured to perform downlink transmission based on the first power difference.

According to a fourth aspect, a terminal device is provided, and includes: a communications unit, configured to receive first information sent by a network device, where the first information is used to indicate a first power difference, the first power difference is related to a first waveform, and the first power difference is an offset between a power of a reference signal and a power of a first physical downlink shared channel (PDSCH) on which the first waveform is used; and a processing unit, configured to obtain the first power difference.

Optionally, the communications unit is further configured to receive second information sent by the network device. The second information is used to indicate waveform information corresponding to CSI that needs to be reported by the terminal device.

Optionally, the communications unit is further configured to: send request information to the network device, and receive the second information sent by the network device. The request information is used to request the network device to indicate the waveform information corresponding to the CSI that needs to be reported by the terminal device.

Optionally, the sending unit is configured to send third information to the network device. The third information is used to indicate waveform information corresponding to CSI to be reported by the terminal device.

Optionally, if the reference signal is a channel state information reference signal, the processing unit is configured to determine the CSI based on the first power difference; and the communications unit is further configured to send the CSI to the network device.

Optionally, if the reference signal is a DMRS, the communications unit is configured to receive, based on the first power difference, downlink transmission performed by the network device.

For related limitations on parameters such as the first information and a waveform, refer to the foregoing descriptions. Details are not described herein again.

According to a fifth aspect, a chip is provided. The chip is located in a network device and includes: a logic circuit, configured to determine first information, where the first information is used to indicate a first power difference, the first power difference is related to a first waveform, and the first power difference is an offset between a power of a reference signal and a power of a first physical downlink shared channel (PDSCH) on which the first waveform is used; and an output port, configured to output the first information.

Optionally, the output port is further configured to output and send second information. The second information is used to indicate waveform information corresponding to channel state information (CSI) that needs to be reported by a terminal device.

Optionally, the chip further includes an input port, further configured to input request information from the terminal device. The request information is used to request the network device to indicate the waveform information corresponding to the CSI that needs to be reported by the terminal device.

Optionally, the input port is further configured to input third information from the terminal device. The third information is used to indicate waveform information corresponding to CSI to be reported by the terminal device.

Optionally, if the reference signal is a channel state information reference signal, the input port is further configured to input the CSI sent by the terminal device. The CSI is determined based on the first power difference.

According to a sixth aspect, a chip is provided. The chip is located in a terminal device and includes: an input port, configured to input first information from a network device, where the first information is used to indicate a first power difference, the first power difference is related to a first waveform, and the first power difference is an offset between a power of a reference signal and a power of a first physical downlink shared channel (PDSCH) on which the first waveform is used; and a logic circuit, configured to obtain the first power difference.

Optionally, the input port is configured to input second information from the network device. The second information is used to indicate waveform information corresponding to CSI that needs to be reported by the terminal device.

Optionally, the chip further includes an output port, configured to output request information. The request information is used to request the network device to indicate the waveform information corresponding to the CSI that needs to be reported by the terminal device.

Optionally, the output port is configured to output third information. The third information is used to indicate waveform information corresponding to CSI to be reported by the terminal device.

Optionally, if the reference signal is a channel state information reference signal, the logic circuit is configured to determine the CSI based on the first power difference; and the output port is further configured to output the CSI.

For related limitations on parameters such as the first information and a waveform, refer to the foregoing descriptions. Details are not described herein again.

According to a seventh aspect, this application provides a CSI feedback method, including: A network device receives CSI fed back by a terminal device; and the network device determines waveform information corresponding to the CSI.

Optionally, the method further includes: The network device determines second information. The second information is used to indicate waveform information corresponding to channel state information (CSI) that needs to be reported by the terminal device, and the waveform information corresponding to the CSI is the second information.

Optionally, the method further includes: The network device sends the second information to the terminal device.

Optionally, the method further includes: The network device receives request information sent by the terminal device, and the network device sends the second information to the terminal device. The request information is used to request the network device to indicate the waveform information corresponding to the CSI that needs to be reported by the terminal device.

Optionally, the method further includes: The network device receives third information sent by the terminal device. The third information is used to indicate the waveform information corresponding to the CSI to be reported by the terminal device. That the network device determines waveform information corresponding to the CSI includes: The network device determines, based on the third information, the waveform information corresponding to the CSI.

According to an eighth aspect, this application provides a CSI feedback method, including: A terminal device determines waveform information corresponding to CSI that needs to be reported and the CSI, and the terminal device sends the CSI to a network device.

Optionally, the method includes: The terminal device receives second information sent by the network device. That a terminal device determines waveform information corresponding to CSI that needs to be reported includes: determining, based on the second information, the waveform information corresponding to the CSI that needs to be reported. The second information is used to indicate the waveform information corresponding to the channel state information (CSI) that needs to be reported by the terminal device.

Optionally, the method further includes: The terminal device sends request information to the network device. The request information is used to request the network device to send the second information.

Optionally, the method further includes: The terminal device sends third information to the network device. The third information is used to indicate waveform information corresponding to CSI to be reported by the terminal device.

According to a ninth aspect, a network device is provided, and includes: a communications unit, configured to receive CSI fed back by a terminal device; and a processing unit, configured to determine waveform information corresponding to the CSI. Optionally, the processing unit is configured to determine second information. The second information is used to indicate waveform information corresponding to channel state information (CSI) that needs to be reported by the terminal device, and the waveform information corresponding to the CSI is the second information.

Optionally, the communications unit is configured to send the second information to the terminal device.

Optionally, the communications unit is configured to receive request information sent by the terminal device. The request information is used to request the network device to indicate the waveform information corresponding to the CSI that needs to be reported by the terminal device.

Optionally, the communications unit is configured to receive third information sent by the terminal device. The third information is used to indicate waveform information corresponding to CSI to be reported by the terminal device.

According to a tenth aspect, a terminal device is provided, and includes: a processing unit, configured to determine waveform information corresponding to CSI that needs to be reported and the CSI; and a communications unit, configured to send the CSI to a network device.

Optionally, the communications unit is further configured to receive second information sent by the network device. The processing unit is configured to determine, based on the second information, waveform information corresponding to CSI that needs to be reported. The second information is used to indicate the waveform information corresponding to the channel state information (CSI) that needs to be reported by the terminal device.

Optionally, the communications unit is further configured to send request information to the network device. The request information is used to request the network device to send the second information.

Optionally, the communications unit is further configured to send third information to the network device. The third information is used to indicate waveform information corresponding to CSI to be reported by the terminal device.

According to an eleventh aspect, a chip is provided. The chip is located in a network device and includes: an input port, configured to input CSI from a terminal device; and a logic circuit, configured to determine waveform information corresponding to the CSI.

Optionally, the processing unit is configured to determine second information. The second information is used to indicate waveform information corresponding to channel state information (CSI) that needs to be reported by the terminal device, and the waveform information corresponding to the CSI is the second information.

Optionally, the chip further includes an output port, configured to output the second information.

Optionally, the input port is further configured to input request information from the terminal device. The request information is used to request the network device to indicate the waveform information corresponding to the CSI that needs to be reported by the terminal device.

Optionally, the input port is further configured to input third information from the terminal device. The third information is used to indicate the waveform information corresponding to the CSI to be reported by the terminal device.

According to a twelfth aspect, a chip is provided. The chip is located in a terminal device and includes: a logic circuit, configured to determine waveform information corresponding to CSI that needs to be reported by the terminal device and the CSI; and an output port, configured to output the CSI.

Optionally, the chip further includes an input port, further configured to input second information from the network device. The logic circuit is configured to determine, based on the second information, the waveform information corresponding to the CSI that needs to be reported. The second information is used to indicate the waveform information corresponding to the channel state information (CSI) that needs to be reported by the terminal device.

Optionally, the output port is further configured to output request information. The request information is used to request the network device to send the second information.

Optionally, the output port is further configured to output third information. The third information is used to indicate waveform information corresponding to CSI to be reported by the terminal device.

According to a thirteenth aspect, this application provides a communications apparatus. The communications apparatus has a function of implementing the terminal device in any possible implementation of the first aspect. The function may be implemented by hardware, or may be implemented by hardware by executing corresponding software. The hardware or the software includes one or more units corresponding to the foregoing function.

According to a fourteenth aspect, this application provides a communications apparatus. The communications apparatus has a function of implementing the network device in any possible implementation of the second aspect. The function may be implemented by hardware, or may be implemented by hardware by executing corresponding software. The hardware or the software includes one or more units corresponding to the foregoing function.

According to a fifteenth aspect, this application provides a communications apparatus. The communications apparatus has a function of implementing the terminal device in any possible implementation of the fifth aspect. The function may be implemented by hardware, or may be implemented by hardware by executing corresponding software. The hardware or the software includes one or more units corresponding to the foregoing function.

According to a sixteenth aspect, this application provides a communications apparatus. The communications apparatus has a function of implementing the network device in any possible implementation of the sixth aspect. The function may be implemented by hardware, or may be implemented by hardware by executing corresponding software. The hardware or the software includes one or more units corresponding to the foregoing function.

According to a seventeenth aspect, this application provides a terminal device, including a transceiver, a processor, and a memory. The processor is configured to control the transceiver to receive and send a signal, the memory is configured to store a computer program, and the processor is configured to invoke and run the computer program stored in the memory, so that the terminal device performs the method in any possible implementation of the first aspect.

According to an eighteenth aspect, this application provides a network device, including a transceiver, a processor, and a memory. The processor is configured to control the transceiver to receive and send a signal, the memory is configured to store a computer program, and the processor is configured to invoke and run the computer program stored in the memory, so that the network device performs the method in any possible implementation of the second aspect.

According to a nineteenth aspect, this application provides a terminal device, including a transceiver, a processor, and a memory. The processor is configured to control the transceiver to receive and send a signal, the memory is configured to store a computer program, and the processor is configured to invoke and run the computer program stored in the memory, so that the terminal device performs the method in any possible implementation of the fifth aspect.

According to a twentieth aspect, this application provides a network device, including a transceiver, a processor, and a memory. The processor is configured to control the transceiver to receive and send a signal, the memory is configured to store a computer program, and the processor is configured to invoke and run the computer program stored in the memory, so that the network device performs the method in any possible implementation of the sixth aspect.

According to a twenty-first aspect, this application provides a computer-readable storage medium. The computer-readable storage medium stores instructions, and when the instructions are run on a computer, the computer is enabled to perform the method in any possible implementation of the first aspect.

According to a twenty-second aspect, this application provides a computer-readable storage medium. The computer-readable storage medium stores instructions, and when the instructions are run on a computer, the computer is enabled to perform the method in any possible implementation of the second aspect.

According to a twenty-third aspect, this application provides a computer-readable storage medium. The computer-readable storage medium stores instructions, and when the instructions are run on a computer, the computer performs the method in any possible implementation of the fifth aspect.

According to a twenty-fourth aspect, this application provides a computer-readable storage medium. The computer-readable storage medium stores instructions, and when the instructions are run on a computer, the computer is enabled to perform the method in any possible implementation of the sixth aspect.

According to a twenty-fifth aspect, this application provides a chip, including a processor. The processor is configured to read and execute a computer program stored in a memory, to perform the method in any possible implementation of the first aspect. Optionally, the chip includes the memory, and the memory and the processor are connected through a circuit or a wire. Further, optionally, the chip further includes a communications interface, and the processor is connected to the communications interface. The communications interface is configured to receive data and/or information that need/needs to be processed. The processor obtains the data and/or information from the communications interface, processes the data and/or information, and outputs a processing result through the communications interface. The communications interface may be an input/output interface.

According to a twenty-sixth aspect, this application provides a chip, including a processor. The processor is configured to read and execute a computer program stored in a memory, to perform the method in any possible implementation of the second aspect. Optionally, the chip includes the memory, and the memory and the processor are connected through a circuit or a wire. Further, optionally, the chip further includes a communications interface, and the processor is connected to the communications interface. The communications interface is configured to receive data and/or information that need/needs to be processed. The processor obtains the data and/or information from the communications interface, processes the data and/or information, and outputs a processing result through the communications interface. The communications interface may be an input/output interface.

According to a twenty-seventh aspect, this application provides a chip, including a processor. The processor is configured to read and execute a computer program stored in a memory, to perform the method in any possible implementation of the fifth aspect. Optionally, the chip includes the memory, and the memory and the processor are connected through a circuit or a wire. Further, optionally, the chip further includes a communications interface, and the processor is connected to the communications interface. The communications interface is configured to receive data and/or information that need/needs to be processed. The processor obtains the data and/or information from the communications interface, processes the data and/or information, and outputs a processing result through the communications interface. The communications interface may be an input/output interface.

According to a twenty-eighth aspect, this application provides a chip, including a processor. The processor is configured to read and execute a computer program stored in a memory, to perform the method in any possible implementation of the sixth aspect. Optionally, the chip includes the memory, and the memory and the processor are connected through a circuit or a wire. Further, optionally, the chip further includes a communications interface, and the processor is connected to the communications interface. The communications interface is configured to receive data and/or information that need/needs to be processed. The processor obtains the data and/or information from the communications interface, processes the data and/or information, and outputs a processing result through the communications interface. The communications interface may be an input/output interface.

Optionally, the memory and the processor may be units that are physically independent of each other, or the memory may be integrated with the processor.

According to a twenty-ninth aspect, this application provides a computer program product. The computer program product includes computer program code, and when the computer program code runs on a computer, the computer is enabled to perform the method in any possible implementation of the first aspect.

According to a thirtieth aspect, this application provides a computer program product. The computer program product includes computer program code, and when the computer program code runs on a computer, the computer is enabled to perform the method in any possible implementation of the second aspect.

According to a thirty-first aspect, this application provides a computer program product. The computer program product includes computer program code, and when the computer program code runs on a computer, the computer is enabled to perform the method in any possible implementation of the fifth aspect.

According to a thirty-second aspect, this application provides a computer program product. The computer program product includes computer program code, and when the computer program code runs on a computer, the computer is enabled to perform the method in any possible implementation of the sixth aspect.

According to the solution in the embodiments of this application, the network device configures a power difference between the reference signal and PDSCHs on which a waveform and/or different modulation schemes are used, so that the terminal device can determine the CSI more accurately. If the reference signal is a DMRS, the terminal device demodulates a downlink data channel more accurately.

DESCRIPTION OF EMBODIMENTS

The following describes embodiments of this application with reference to the accompanying drawings.

Terms "uplink" and "downlink" in this application are used to describe a direction of transmitting data/information in some scenarios. For example, an "uplink" direction is a direction of transmitting the data/information from a terminal device to a network side, and a "downlink" direction is a direction of transmitting the data/information from a network side device to a terminal device. "Uplink" and "downlink" are only used to describe directions, and a specific device that receives or sends the data/information is not limited.

In the specification, claims, and the accompanying drawings of this application, the terms "first", "second", and so on are intended to distinguish between similar objects but do not necessarily indicate a specific order or sequence. It should be understood that the terms used in such a way is interchangeable in proper circumstances, so that the embodiments described herein can be implemented in other orders than the order illustrated or described herein. Moreover, the terms "include", "contain" and any other variants mean to cover non-exclusive inclusion, for example, a process, method, system, product, or device that includes a list of steps or modules is not necessarily limited to those modules expressly listed, but may include other modules not expressly listed or inherent to such a process, method, system, product, or device. Names and numbers of steps in this application do not mean that the steps in the method process need to be performed in a time/logical sequence indicated by the names or numbers. A sequence of performing the named or numbered process steps may change based on a technical objective to be implemented, provided that a same or similar technical effect can be achieved. Division into modules in this application is logical division. In actual application, there may be another division manner during implementation. For example, a plurality of modules may be combined or integrated into another system, or some features may be ignored or not performed. In addition, the displayed or discussed mutual couplings or direct couplings or communication connections may be implemented by using some interfaces, and the indirect couplings or communication connections between modules may be implemented in an electrical or another similar form. This is not limited in this application. In addition, modules or submodules described as separate components may be or may not be physically separated, or may be or may not be physical modules, or may not be distributed into a plurality of circuit modules. Objectives of the solutions of this application may be achieved by selecting some or all of the modules based on an actual requirement.

Figure 1:
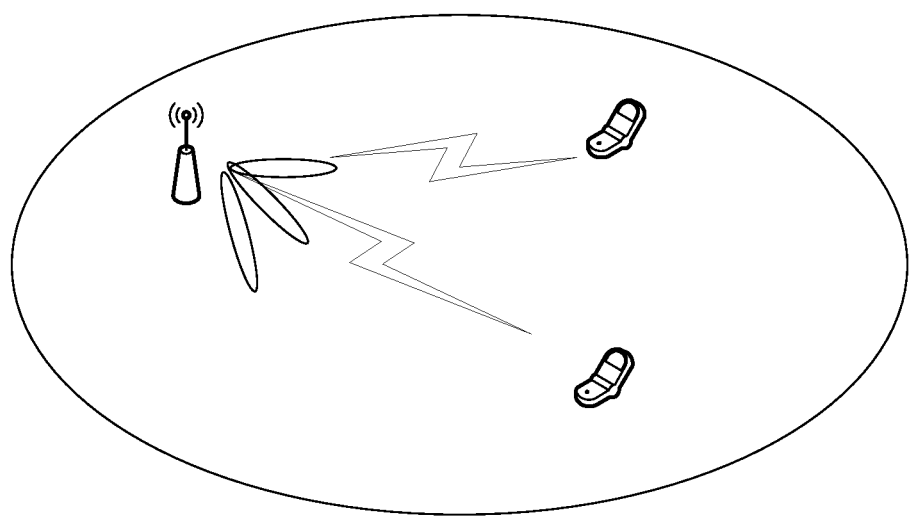
FIG. 1 is a schematic diagram of an embodiment of a signal transmission system according to an embodiment of this application.

FIG. 1 is a schematic diagram of a signal transmission communications system according to an embodiment of this application. The system includes a network device and a terminal device. The communications system may be a long term evolution (LTE) system, or may be a 5th generation (5G) mobile communications system, a new radio (NR) system, a machine-to-machine (M2M) system, or the like that evolves in the future. In the communications system, a single-carrier waveform may be used for downlink transmission. A hybrid waveform of the single-carrier waveform and a multi-carrier waveform may also be used for downlink transmission.

The network device in the embodiments of this application is an apparatus deployed in a radio access network to provide a wireless communication function for a terminal device. The network device may include a macro base station, a micro base station (which is also referred to as a small cell), a relay station, an access point, and the like in various forms. In systems that use different radio access technologies, names of a device that has a base station function may be different. For example, in an LTE system, the device is referred to as an evolved NodeB (eNB or eNodeB), and in a 3rd generation (3G for short) system, the device is referred to as a NodeB (NodeB), or a gNodeB gNB in a 5G system, a new air interface (NR) system, or the like. In addition, the network device may also be an access point (AP), a transmission and reception point (TRP), a central unit (CU), or another network entity, and may include some or all of the functions of the foregoing network entity. For ease of description, in all the embodiments of this application, all the foregoing apparatuses that provide a wireless communication function for the terminal device are referred to as a network device or a base station or a BS.

The terminal device in the embodiments of this application may include various handheld devices, vehicle-mounted devices, wearable devices, or computing devices that have a wireless communication function, or other processing devices connected to a wireless modem. The terminal device may be an MS (English: Mobile Station), a subscriber unit (English: subscriber unit), a cellular phone (English: cellular phone), a smartphone (English: smartphone), a wireless data card, or a personal digital assistant (English: Personal Digital Assistant, PDA for short) computer, a tablet computer, a wireless modem (English: modem), a handheld device (English: handheld device), a laptop computer (English: laptop computer), a machine type communication (English: Machine Type Communication, MTC for short) terminal device, or the like.

Figure 2:
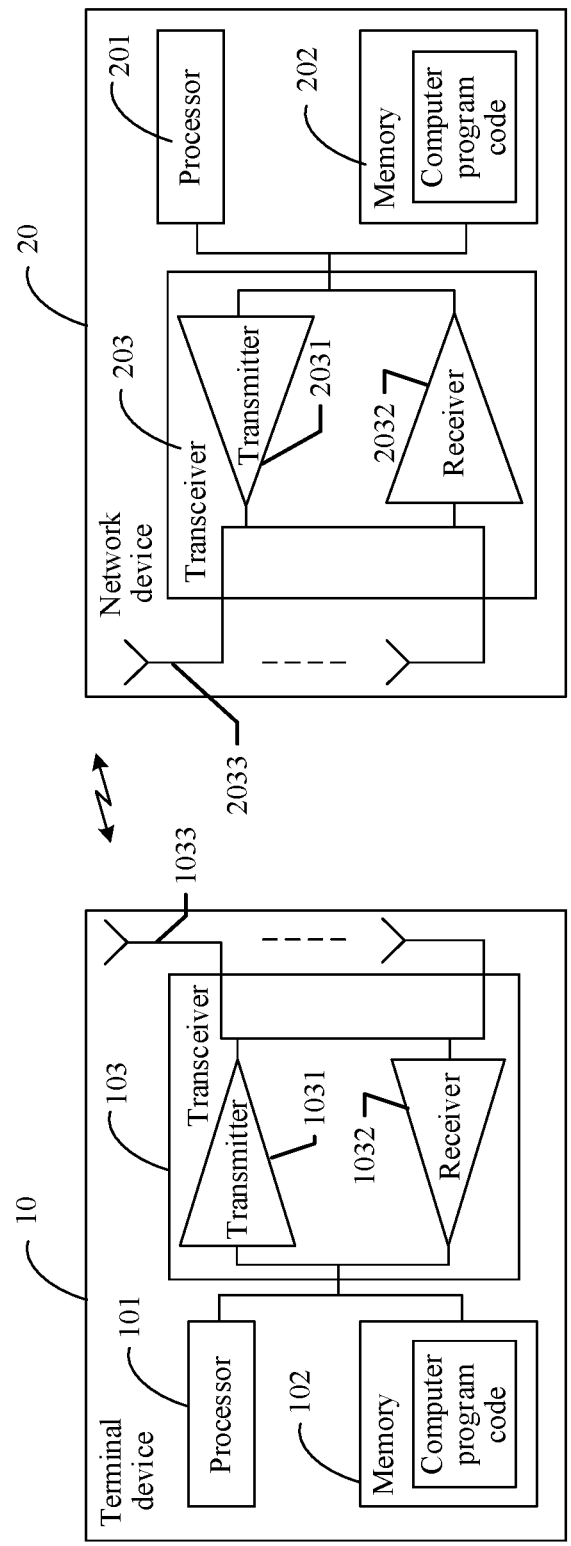
FIG. 2 is a schematic diagram of another embodiment of a signal transmission system according to an embodiment of this application.

The signal transmission system shown in FIG. 1 may alternatively be represented in another form. As shown in FIG. 2, a signal transmission system includes a terminal device 10 and a network device 20. The terminal device 10 includes a processor 101, a memory 102, and a transceiver 103. The transceiver 103 includes a transmitter 1031, a receiver 1032, and an antenna 1033. The network device 20 includes a processor 201, a memory 202, and a transceiver 203. The transceiver 203 includes a transmitter 2031, a receiver 2032, and an antenna 2033.

This application is applicable to a scenario in which the single-carrier waveform is used for downlink transmission or a scenario in which a hybrid of the single-carrier waveform and the multi-carrier waveform is used for downlink transmission.

The network device may send a CSI-RS and a PDSCH at different powers. When the single-carrier waveform is used for downlink transmission, different modulation schemes correspond to different PAPRs. For example, a PAPR corresponding to binary phase shift keying (pi/2-BPSK) modulation is much lower than a PAPR corresponding to another modulation scheme. To maintain an advantage in the PAPR, frequency division is not performed on the single-carrier waveform. In other words, only one modulation scheme is used for sending in a downlink at a moment. Therefore, when the single-carrier waveform is used in the downlink, different modulation schemes correspond to different powers. If different modulation schemes correspond to a same power, a coverage advantage of the single-carrier waveform is difficult to implement. To enable the terminal device to accurately deduce, based on a CSI-RS measurement result, CSI including CQI, or the like, or to enable the terminal device to demodulate a downlink data channel more accurately, the network device notifies the terminal device of information about an offset between a power of a reference signal and a power of a PDSCH on which a specified modulation scheme is used.

For ease of understanding the embodiments of this application, several basic concepts are first described.

(I) Single-Carrier Waveform and Multi-Carrier Waveform

Usually, for a single data stream, modulation symbols of the single-carrier waveform are arranged in time domain after pulse shaping. Pulse shaping may be implemented in frequency domain (for example, DFT-S-OFDM), or may be implemented in time domain (for example, SC-QAM). Modulation symbols of the multi-carrier waveform (for example, an OFDM waveform) are arranged in two dimensions: time domain and frequency domain. The single-carrier waveform may include a DFT-s-OFDM waveform, a unique word (UW)-DFT-s-OFDM waveform, and a zero tail (ZT)-DFT-s-OFDM waveform, or a time domain shaped single-carrier waveform (for example, a single-carrier (SC)-quadrature amplitude modulation (QAM) waveform), or the like. The multi-carrier waveform may include the OFDM waveform, some variants based on the OFDM waveform, or the like.

(II) Reference Signal

The reference signal may include a CSI-RS, a demodulation reference signal (DMRS), or the like. The CSI-RS includes a non-zero-power (NZP)-CSI-RS used for channel measurement, an NZP-CSI-RS used for interference measurement, a zero-power (ZP)-CSI-RS used for interference measurement, or the like.

(III) Modulation Scheme

The modulation scheme includes pi/2-BPSK, QPSK, 16QAM, 64QAM, 256QAM, or the like. A case in which a network device uses another type of modulation scheme is not excluded in this application. For a single-carrier waveform, a PDSCH has different powers in different modulation schemes. For example, with an increase in a modulation order, a corresponding power of the PDSCH decreases continuously. A power of a reference signal depends on a sequence of the reference signal, an implementation of the network device, and/or the like. The power of the reference signal is not limited in this application.

(IV) Power Difference

The power difference may also be referred to as a power offset (power offset) or a power control offset. An offset between a power of a reference signal and a power of a PDSCH may be represented by a power difference between resource elements (RE). The power of the reference signal may be a power of an RE that carries the reference signal. The power of the PDSCH may be a power of an RE that carries the PDSCH. A unit of power difference is usually dB. In a communications protocol, a unit of power is dBm or W. If the unit of power is dBm, a difference between a power P1 and a power P2 of two signals is P1-P2, namely, the power difference. If the unit of power is W, a power ratio P1/P2 between two signals is usually calculated first and then converted to a value in a unit of dB. In other words, the power difference is $10*\log\_10(P1/P2)$. For example, when the unit of power is W, the power difference is a ratio of an energy per resource element (EPRE) of the PDSCH to an EPRE of a CSI-RS, and then the ratio is converted to a value in a unit of dB. The power in this application may be a transmit power or a receive power.

An offset between a power of the CSI-RS and the power of the PDSCH may be referred to as a power difference of the CSI-RS. A power difference that is of the CSI-RS and that is configured by a network device is an assumed power difference. The power difference that is of the CSI-RS and that is configured by the network device is used by a terminal device to calculate CSI. The power difference that is of the CSI-RS and that is configured by the network device may be different from an actual transmission power difference between the power of the CSI-RS and the power of the PDSCH.

An offset between a power of a DMRS and the power of the PDSCH may be referred to as a power difference of the DMRS. The power difference of the DMRS is used by the terminal device to demodulate a data channel. A power difference that is of the DMRS and that is configured by the network device is the same as an actual transmission power difference. In an existing protocol, there is a fixed power difference between an RE of the DMRS and the RE of the PDSCH. However, in a single-carrier waveform, it may be considered that different power differences of the DMRS are configured for different modulation schemes, to improve demodulation performance. It should be noted that, because of a difference in a DMRS type, a multiplexing manner, and the like, there is a fixed power difference between the RE of the DMRS and the RE of the PDSCH. For example, when a type 1 DMRS configuration of NR is used and the DMRS is not multiplexed with data, the RE of the DMRS has a gain of 3 dB in comparison with the RE of the PDSCH. The power difference between the RE of the DMRS and the RE of the PDSCH in this application is an additional power difference in addition to the fixed power difference.

This application relates to the following several power differences.

1. First Power Difference

The first power difference is related to a first waveform. The first power difference is an offset between a power of a reference signal and a power of a first physical downlink shared channel (PDSCH) on which the first waveform is used. The first waveform may be a single-carrier waveform or a multi-carrier waveform.

Optionally, if the first waveform is the single-carrier waveform, the first power difference is related to the first waveform and a first modulation scheme. The first power difference is an offset between the power of the reference signal and a power of a PDSCH on which the first waveform and the first modulation scheme are used. The first modulation scheme is any one of the foregoing modulation schemes. For example, the first modulation scheme is used on the first PDSCH, and the single-carrier waveform is used on the first PDSCH.

2. Second Power Difference

The second power difference is related to a second waveform. The second power difference is an offset between the power of the reference signal and a power of a second PDSCH on which the second waveform is used. The second waveform may be a multi-carrier waveform or a single-carrier waveform. Optionally, the first waveform and the second waveform may be different. For example, the multi-carrier waveform is used on the second PDSCH, and the single-carrier waveform is used on the first PDSCH.

Optionally, the second power difference is related to the second waveform and a second modulation scheme. The second power difference is an offset between the power of the reference signal and a power of a second PDSCH on which the second waveform and the second modulation scheme are used. The second modulation scheme is any one of the foregoing modulation schemes.

3. Third Power Difference

The third power difference is an offset between the power of the first PDSCH and the power of the second PDSCH.

4. Fourth Power Difference

A power of a PDSCH on which the single-carrier waveform is used is related to a modulation scheme used on the PDSCH. In other words, PDSCHs on which different modulation schemes and the single-carrier waveform are used have different powers. For example, a transmit power of a PDSCH on which pi/2-BPSK and the single-carrier waveform are used, a transmit power of a PDSCH on which QPSK and the single-carrier waveform are used, a transmit power of a PDSCH on which 16QAM and the single-carrier waveform are used, a transmit power of a PDSCH on which 64QAM and the single-carrier waveform are used, and a transmit power of a PDSCH on which 256QAM and the single-carrier waveform are used are in descending order.

The fourth power difference is related to the first waveform and the second modulation scheme. The fourth power difference is an offset between the power of the reference signal and a power of a third PDSCH on which the first waveform and the second modulation scheme are used. The second modulation scheme is any one of the foregoing modulation schemes. The first modulation scheme and the second modulation scheme are different. The first waveform is a single-carrier waveform.

5. Fifth Power Difference

The fifth power difference is an offset between the power of the first PDSCH and the power of the third PDSCH.

Optionally, the first power difference may be determined based on the second power difference and the third power difference. Alternatively, the first power difference may be determined based on the fourth power difference and the fifth power difference. Optionally, the third power difference and/or the fifth power difference each may be a preset value.

Based on the concepts described above, the following describes a channel state information feedback method provided in the embodiments of this application. An example in which the reference signal is a CSI-RS is used for description.

An embodiment of this application provides a method 300 for notifying information about a power difference. A network device notifies a terminal device of information about an offset between a power of a reference signal and a power of a PDSCH on which a specified modulation scheme is used, so that the terminal device more accurately deduces, based on the information about the power difference, CSI including CQI, and the like, or the terminal device demodulates a downlink data channel more accurately.

Figure 3:
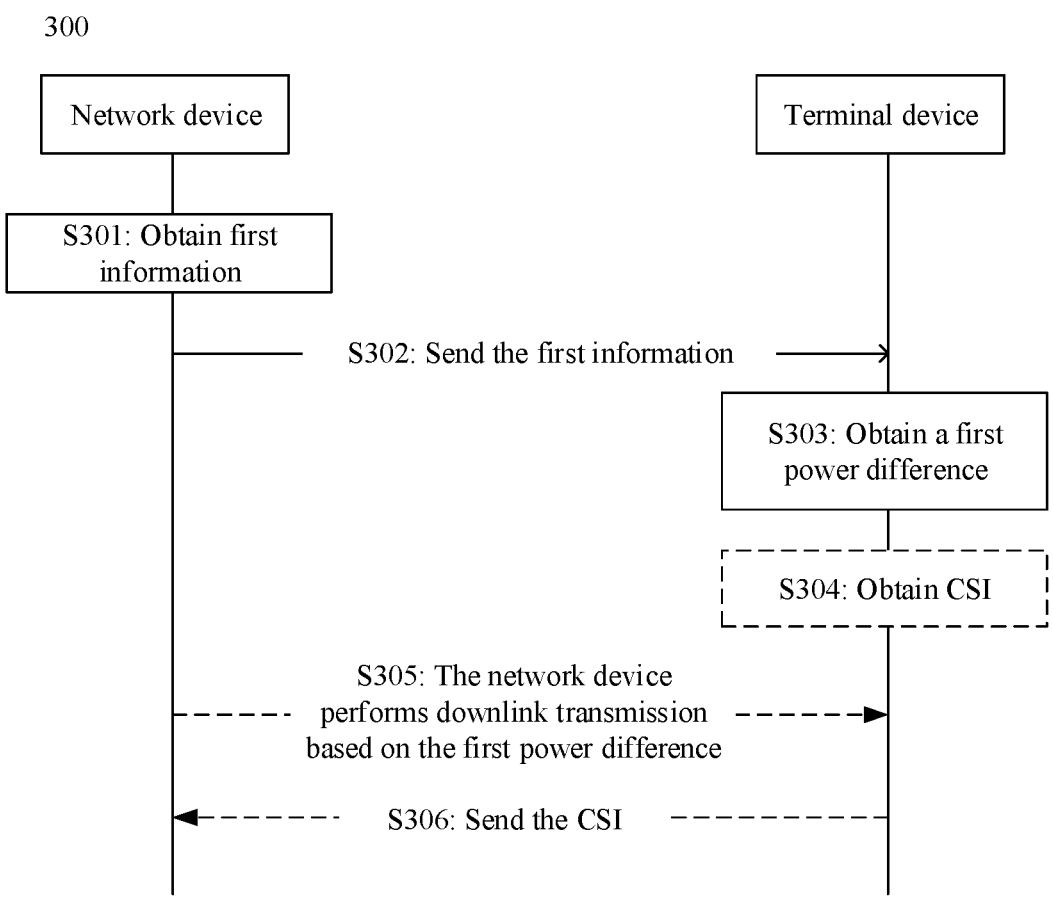
FIG. 3 is a schematic flowchart of a method for notifying information about a power difference according to an embodiment of this application.

FIG. 3 is a schematic flowchart of a method 300 for notifying information about a power difference according to an embodiment of this application.

S301: A network device obtains first information.

The first information is used to indicate a first power difference. The first information may indicate at least one first power difference.

Optionally, if the first information indicates a plurality of first power differences, at least two of the plurality of first power differences correspond to different first waveforms. For example, one first power difference is an offset between a power of a reference signal and a power of a PDSCH on which a single-carrier waveform is used, and another first power difference is an offset between the power of the reference signal and a power of a PDSCH on which a multi-carrier waveform is used.

Optionally, if the first information indicates a plurality of first power differences, at least two of the plurality of first power differences correspond to different modulation schemes. For example, the plurality of first power differences are respectively offsets between the power of the reference signal and powers of PDSCHs on which the single-carrier waveform and different modulation schemes are used.

The first information may directly include information about the first power difference.

The first information may alternatively include information about a second power difference and information about a third power difference. If the third power difference is preset, the first information includes the information about the second power difference. In this case, the first power difference may be determined based on the information about the second power difference and the information about the third power difference.

The first information may alternatively include information about a fourth power difference and information about a fifth power difference. If the fifth power difference is preset, the first information includes the information about the fourth power difference. In this case, the first power difference may be determined based on the information about the fourth power difference and the information about the fifth power difference.

When a single-carrier waveform is used in a downlink, the network device sends, at different transmit powers, PDSCHs on which different modulation schemes are used. In this application, the network device separately determines offsets between the power of the reference signal and powers of the PDSCHs on which different modulation schemes are used. Therefore, a terminal device may correctly determine CSI such as CQI, or demodulate a downlink data channel more accurately based on power differences corresponding to the different modulation schemes.

S302: The network device sends the first information to the terminal device. The terminal device receives the first information sent by the network device.

(I) If the First Information Includes the Information about the First Power Difference, the First Information May be Sent in any One of the Following Manners.

(1) The network device includes the information about the first power difference in an information element of a configuration message, and sends the information element to the terminal device. For example, the information about the first power difference is carried in an information element (IE) of reference signal resource configuration information, for example, the following NZP-CSI-RS-Resource information element (NZP-CSI-RS-resource information element):

| NZP-CSI-RS-Resource information element |  |
|---|---|
| NZP-CSI-RS-Resource ::= | SEQUENCE { |
| ... | |
| powerControlOffset | INTEGER(−8..15), |
| powerControlOffsetSCQm1 | INTEGER(−8..15), |
| powerControlOffsetSCQm2 | INTEGER(−8..15), |
| powerControlOffsetSCQm4 | INTEGER(−8..15), |
| powerControlOffsetSCQm6 | INTEGER(−8..15), |
| powerControlOffsetSCQm8 | INTEGER(−8..15), |
| ... | |
| } | |

Herein, powerControlOffsetSCQm1 to powerControlOffsetSCQm8 respectively represent power differences of an RE of an NZP-CSI-RS from REs of PDSCHs on which different modulation schemes (Qm1 represents pi/2-BPSK, Qm2 represents QPSK, Qm4 represents 16QAM, Qm6 represents 64QAM, and Qm8 represents 256QAM) and the single-carrier waveform are used, and powerControlOffset indicates a power difference of the RE of the NZP-CSI-RS from an RE of the PDSCH on which the multi-carrier waveform is used. In the foregoing example, a value range of a power difference corresponding to the single-carrier waveform (in different modulation schemes) may be (−8, 15). In fact, the power difference corresponding to the single-carrier waveform (in different modulation schemes) may alternatively have another value range. For example, the value range is changed to (−12, 11). The power difference may be any integer in the value range. In this application, the power difference is referred to as the power difference corresponding to the single-carrier waveform (in different modulation schemes).

(2) The network device includes the first information in a sequence, and sends the sequence to the terminal device.

For example, the network device may include the power difference corresponding to the single-carrier waveform in a sequence [Y1 dB, Y2 dB, Y4 dB, Y6 dB, Y8 dB]. Values in the sequence respectively represent power differences of an RE of an NZP-CSI-RS from REs of PDSCHs on which different modulation schemes (Qm1 represents pi/2-BPSK, Qm2 represents QPSK, Qm4 represents 16QAM, Qm6 represents 64QAM, and Qm8 represents 256QAM) and the single-carrier waveform are used.

(II) The First Information Includes the Information about the Second Power Difference and the Information about the Third Power Difference.

The network device notifies the terminal device of the information about the second power difference and the information about the third power difference. The information about the second power difference and the information about the third power difference may be carried in one message, or may be respectively carried in two messages. For example, the network device may notify information about a power difference of an RE of an NZP-CSI-RS from an RE of a PDSCH on which an OFDM waveform is used, and also notify information about power differences between REs of PDSCHs on which the single-carrier waveform and different modulation schemes are used and the RE of the PDSCH on which the OFDM waveform is used.

(III) The First Information Includes the Information about the Second Power Difference.

The network device notifies the terminal device of the information about the second power difference. The information about the third power difference is preset, and the network device does not need to notify the information about the third power difference. The network device and the terminal device may obtain the third power difference through a definition in a protocol, or the like.

(IV) The First Information Includes the Information about the Fourth Power Difference and the Information about the Fifth Power Difference.

The network device notifies the terminal device of the information about the fourth power difference and the information about the fifth power difference. The information about the fourth power difference and the information about the fifth power difference may be carried in one message, or may be respectively carried in two messages. For example, the network device may notify a power difference of an RE of an NZP-CSI-RS from an RE of a PDSCH on which a specified modulation scheme (a reference modulation scheme) and the single-carrier waveform are used, and also notify a power difference between REs of PDSCHs on which different modulation schemes and the single-carrier waveform are used and the RE of the PDSCH on which the reference modulation scheme and the single-carrier waveform are used.

(V) The First Information Includes the Information about the Fourth Power Difference.

The network device notifies the terminal device of the information about the fourth power difference. The information about the fifth power difference is preset, and the network device does not need to notify the information about the fifth power difference. The network device and the terminal device may obtain the fifth power difference through a definition in the protocol, or the like.

According to any of the foregoing example methods or another method not described as an example in this application, the terminal device may learn of power differences corresponding to a downlink single-carrier waveform in different modulation schemes from the network device, and may learn of a power difference between a PDSCH on which the single-carrier waveform is used (in different modulation schemes) and the reference signal. In addition, the network device may further configure, for the terminal device, power differences corresponding to the single-carrier waveform in different modulation schemes in a spectral shaping technology. A configuration manner is similar to that in the foregoing examples. Details are not described herein.

S303: The terminal device obtains the first power difference.

The reference signal may include a CSI-RS, a DMRS, or the like. If the reference signal includes the CSI-RS, steps S304 and S306 may continue to be performed in this embodiment of this application. If the reference signal includes the DMRS, step S305 may continue to be performed in this embodiment of this application.

S304: The terminal device determines the CSI based on the first power difference.

The network device sends the reference signal (CSI-RS) to the terminal device, and performs derivation on a measurement result of the reference signal based on the first power difference, to obtain the CSI including the CQI. For example, after obtaining the first power difference, the terminal device needs to consider the first power difference when calculating and reporting the CSI such as the CQI. For example, it is assumed that power differences of 256QAM, 64QAM, 16QAM, QPSK, and pi/2-BPSK from the CSI-RS are respectively −4 dB, −2 dB, 0 dB, 2 dB, and 4 dB, and an SINR obtained by the terminal device through measurement on the CSI-RS is 20 dB. In this case, the terminal device may deduce that when the network device performs transmission in different modulation schemes, corresponding SINRs are respectively 16 dB, 18 dB, 20 dB, 22 dB, and 24 dB. In this case, the terminal device may select proper to-be-reported CQI based on this group of SINRs. If the terminal device does not know the first power difference, the terminal device may report the CQI based on an assumption that the SINR of 20 dB is used in different modulation schemes. Consequently, incorrect CQI is reported. In the foregoing example, the first power difference affects only reporting of the CQI. In an implementation, the first power difference may further affect reporting of other CSI such as an RI and a PMI. It should be noted that after a power difference is considered, a specific CSI calculation manner depends on an implementation of the terminal device, but the terminal device needs to ensure that the reported CQI meets BLER performance specified in the protocol. For example, when the network device sends the PDSCH to the terminal device by using an MCS corresponding to the CQI reported by the terminal device, the terminal device needs to ensure that the BLER performance is below 0.1.

It should be noted that, in this embodiment, the CQI is reported as an example of the CSI, but UE also needs to consider the power difference in this application when calculating and deriving remaining CSI parameters. The remaining CSI parameters include the PMI, the RI, a layer indicator (LI), and a CSI-RS resource indicator (CRI).

S306: The terminal device sends the CSI to the network device, and the network device receives the CSI sent by the terminal device.

The terminal device sends the CSI to the network device through a PUSCH or a PUCCH.

S305: The network device performs downlink transmission to the terminal device based on the first power difference.

A DMRS power difference is used by the terminal device to demodulate a data channel. A DMRS power difference configured by the network device is the same as an actual transmission power difference. The network device determines a downlink transmission power based on the first power difference, and performs downlink transmission based on the downlink transmission power. The terminal device performs data channel demodulation on the downlink transmission based on the first power difference.

In this embodiment of the present invention, the network device configures a power difference between the reference signal and a PDSCH on which a waveform and/or different modulation schemes are used, so that the terminal device can determine the CSI more accurately. If the reference signal is a DMRS, the terminal device demodulates the downlink data channel more accurately.

This application further provides a channel state information (CSI) feedback method. The CSI feedback method may be combined with the embodiment corresponding to FIG. 3, or may exist independently.

Figure 4:
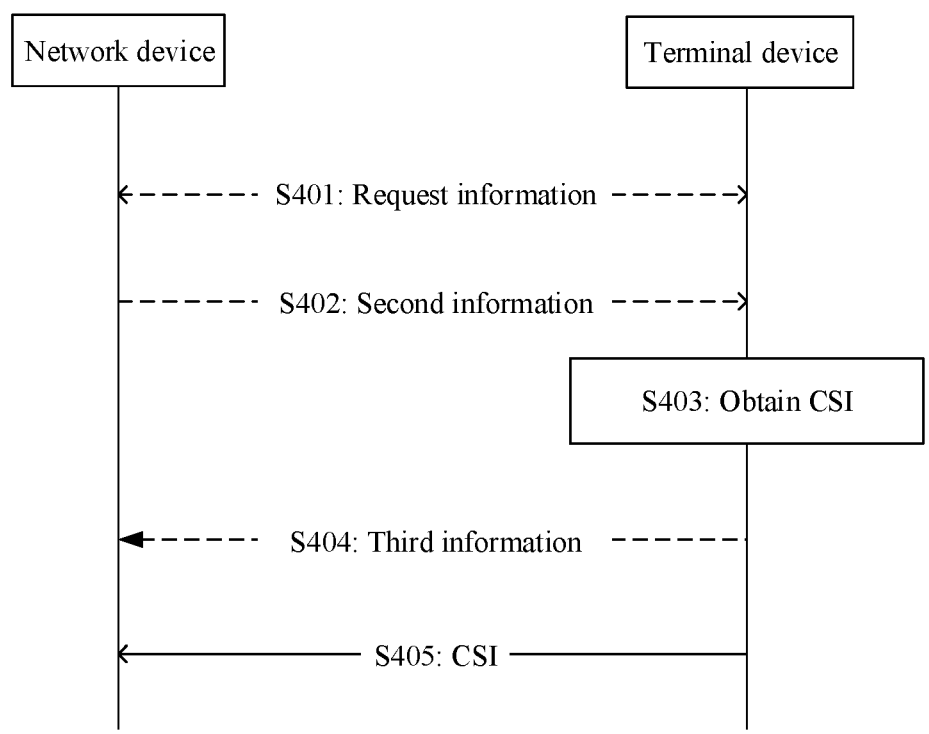
FIG. 4 is a schematic flowchart of a CSI feedback method 400 according to an embodiment of this application.

FIG. 4 is a schematic flowchart of a CSI feedback method 400 according to an embodiment of this application.

S401: A terminal device sends a request message to a network device, and the network device receives the request message sent by the terminal device.

The request message is used to request the network device to configure second information for the terminal device. The second information is used to indicate waveform information corresponding to channel state information (CSI) that needs to be reported by the terminal device.

This step is optional.

S402: The network device sends the second information to the terminal device, and the terminal device receives the second information sent by the network device.

In an assumption of different downlink waveforms, the terminal device may obtain different CSI calculation results. Usually, frequency division multiplexing is not performed on a single-carrier waveform. In a possible implementation, for the single-carrier waveform, only wideband CSI is reported, and subband CSI is not reported. In a hybrid waveform scenario, the terminal device may separately obtain CSI of an OFDM waveform and CSI of the single-carrier waveform through calculation based on power offset information and other assumption information. However, the network device also needs to obtain the CSI of the two waveforms, to determine a scheduling policy.

When separately calculating the CSI of the OFDM waveform and the CSI of the single-carrier waveform, the terminal device needs to consider at least a power difference between the two waveforms. The power difference is provided in other embodiments of this application. Details are not described herein again.

In a possible implementation, when the terminal device calculates CSI of different waveforms, different phase tracking reference signal (PTRS) configurations are assumed. For example, when the OFDM waveform is used, a frequency-domain discrete PTRS configuration is assumed, and when the single-carrier waveform is used, a time-domain PTRS configuration is assumed.

When the terminal device calculates the CSI of different waveforms, different SINR mapping manners are used. The SINR mapping manner herein means that after estimating a channel by using a CSI-RS, the terminal device obtains an SINR of a receiver of the OFDM waveform and the single-carrier waveform in different calculation manners, and further deduces CSI such as CQI of different waveforms. In the following, the CSI of the OFDM waveform is denoted as CSI_O, and the CSI of the single-carrier waveform is denoted as CSI_S.

The network device may configure a CSI reporting configuration (CSI reporting configuration) in the network device, and simultaneously configure the second information. The network device may deliver a plurality of CSI reporting configurations to the terminal device, and each CSI reporting configuration corresponds to one piece of second information.

The second information may indicate the terminal device to report CSI corresponding to a waveform, for example, CSI_O or CSI_S. The second information may alternatively indicate the terminal device to report the CSI corresponding to the two waveforms, for example, CSI_O and CSI_S.

This step is optional, and the terminal device may independently select a waveform that needs to be reported.

S403: The terminal device determines the waveform information corresponding to the CSI that needs to be reported and the CSI.

If the network device sends the second information to the terminal device, that the terminal device determines the waveform information corresponding to the CSI that needs to be reported includes: The terminal device determines, based on the second information, the waveform information corresponding to the CSI that needs to be reported. The terminal device determines that the CSI that needs to be reported is CSI corresponding to the waveform indicated by the second information.

If the second information indicates two waveforms, the CSI that may need to be reported by the terminal device includes the following cases.

(1) Complete CSI_O and complete CSI_S. An advantage of this manner is accurate reporting, but a disadvantage of this manner is high overheads.

(2) Partial CSI_O and CSI_S are reported. For example, CSI such as an RI and a PMI that may be shared by the two waveforms is reported only once, and information such as CQI corresponding to the single-carrier waveform and CQI corresponding to the multi-carrier waveform is separately reported. In the case (2), CQI of a waveform may be reported in incremental mode. For example, information such as the complete CSI_O and the CQI corresponding to the single-carrier waveform is reported.

Alternatively, the terminal device may independently select CSI corresponding to a specific waveform. Although the single-carrier waveform has a power advantage, the OFDM waveform may have a relatively great advantage in demodulation performance in a specified channel condition, to compensate for a disadvantage in a transmit power of the OFDM waveform. The network device cannot learn of a waveform that is suitable for the terminal device to perform downlink communication, and the terminal device may obtain a suitable waveform through CSI-RS measurement and calculation. Therefore, the network device may configure a CSI reporting configuration for the terminal device, and CSI that corresponds to a specific waveform and that is to be reported by the terminal device is determined by the terminal device.

S404: The terminal device sends third information to the network device, and the network device receives the third information reported by the terminal device.

The third information is used to indicate waveform information corresponding to the CSI to be reported by the terminal device.

If the terminal device independently selects the CSI corresponding to the specific waveform, when reporting the CSI, the terminal device may explicitly or implicitly notify the network device of the waveform information corresponding to the CSI to be reported by the terminal device. For example, a 1-bit waveform indication corresponding to the reported CSI is reserved in a CSI reporting message.

This step is optional.

S405: The terminal device sends the CSI determined by the terminal device to the network device, and the network device receives the CSI.

If step S404 exists, the network device determines, based on the received third information, the waveform information corresponding to the CSI to be reported by the terminal device.

In this embodiment, the terminal device determines, based on a configuration of the network device, the CSI that corresponds to the specific waveform and that is to be reported, or independently determines the CSI, to feed back the CSI in a scenario in which a hybrid waveform (a hybrid of the single-carrier waveform and the multi-carrier waveform) is used for downlink transmission. After receiving a feedback from the terminal device, a base station may learn of performance of performing data transmission with the UE by using different waveforms, so that the base station may decide, based on a feedback amount of the terminal and another factor, a waveform used for scheduling, to achieve higher spectral efficiency or energy efficiency.

The implementation corresponding to FIG. 4 may be combined with the embodiment corresponding to FIG. 3. For example, in the embodiment corresponding to FIG. 3, step S401, S402, or S404 is added. If the first information indicates a plurality of first power differences, and at least two of the plurality of first power differences correspond to different waveforms, the terminal device may determine the CSI based on the information about the first power difference and the second information in step S304. In other words, the terminal device may determine, based on the information about the first power difference, CSI corresponding to a waveform configured by the network device. Alternatively, the terminal device may determine, based on the information about the first power difference, CSI corresponding to a waveform selected by the UE. If the terminal device independently selects a waveform corresponding to the reported CSI, the terminal device may notify the network device of the third information.

The following describes a communications apparatus provided in this application.

Figure 5:
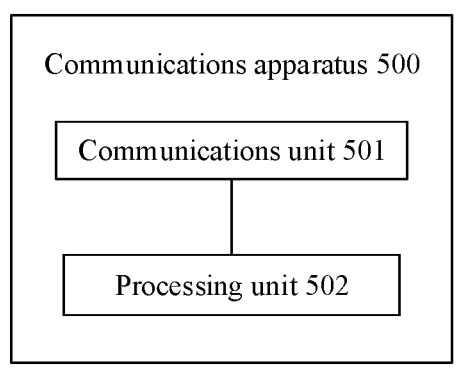
FIG. 5 is a schematic structural block diagram of a communications apparatus 500 according to an embodiment of this application.

FIG. 5 is a schematic structural block diagram of a communications apparatus 500 according to an embodiment of this application. As shown in FIG. 5, the communications apparatus 500 includes a communications unit 501 and a processing unit 502.

Optionally, the communications apparatus 500 may correspond to the terminal device in the method for notifying information about a power difference provided in this application. Units included in the communications apparatus 500 are separately configured to implement a corresponding operation and/or procedure of the terminal device in the method for notifying information about a power difference and/or the CSI feedback method and the embodiments thereof.

Specifically, the communications unit 501 and the processing unit 502 are separately configured to perform the following operations.

The communications unit 501 is configured to support the terminal device in performing a step in which the terminal device performs sending and/or receiving in the embodiments.

The processing unit 502 is configured to support the terminal device in performing a step in which the terminal device performs determining in the embodiments, a function other than functions of a sending unit and a receiving unit, and the like.

Optionally, the communications apparatus 500 may be a chip or an integrated circuit installed in the terminal device.

Optionally, the communications unit 501 may include the sending unit and the receiving unit. The sending unit is configured to support the terminal device in performing a step in which the terminal device performs sending in the embodiments. The receiving unit is configured to support the terminal device in performing a step in which the terminal device receives information in the embodiments.

Optionally, the communications unit 501 may be a transceiver, and the processing unit 502 may be a processor. The transceiver may include a transmitter and a receiver, to jointly implement a transceiver function. Alternatively, the communications unit 501 may be an input/output interface or an input/output circuit.

Figure 6:
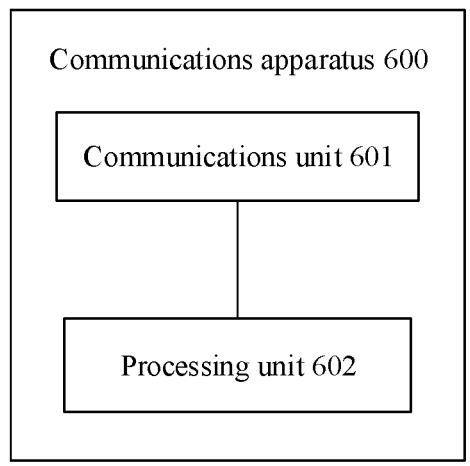
FIG. 6 is a schematic structural block diagram of a communications apparatus 600 according to an embodiment of this application.

FIG. 6 is a schematic structural block diagram of a communications apparatus 600 according to an embodiment of this application. As shown in FIG. 6, the communications apparatus 600 includes a processing unit 602 and a communications unit 601.

Optionally, the communications apparatus 600 may correspond to the network device in the method for notifying information about a power difference provided in this application, or may be a chip or an integrated circuit installed in the network device. Units included in the communications apparatus 600 are separately configured to implement a corresponding operation and/or procedure of the network device in the method for notifying information about a power difference and/or the CSI feedback method and the embodiments thereof.

Specifically, the communications unit 601 and the processing unit 602 are separately configured to perform the following operations.

The communications unit 601 is configured to support the network device in performing a step in which the network device performs sending and/or receiving in the embodiments.

The processing unit 602 is configured to support the network device in performing a step in which the network performs determining in the embodiments, a function other than functions of a sending unit and a receiving unit, and the like.

Optionally, the communications unit 601 may include the sending unit and the receiving unit. The sending unit is configured to support the network device in performing a step in which the network device performs sending in the embodiments. The receiving unit is configured to support the network device in performing a step in which the network device receives information in the embodiments.

Optionally, the communications unit 601 may be a transceiver, and the processing unit 602 may be a processor. The transceiver may include a transmitter and a receiver, to jointly implement a transceiver function. Alternatively, the communications unit 601 may be an input/output interface or an input/output circuit.

The network device and the terminal device in the foregoing apparatus embodiments completely correspond to the network device and the terminal device in the method embodiments, and a corresponding unit performs a corresponding step in the methods. For example, a communications unit performs sending and receiving steps in the method embodiments, and a step other than the sending and receiving steps may be performed by a processing unit. The communications unit may also be referred to as a transceiver unit. The transceiver unit includes a sending unit and a receiving unit, and has both sending and receiving functions.

Figure 7:
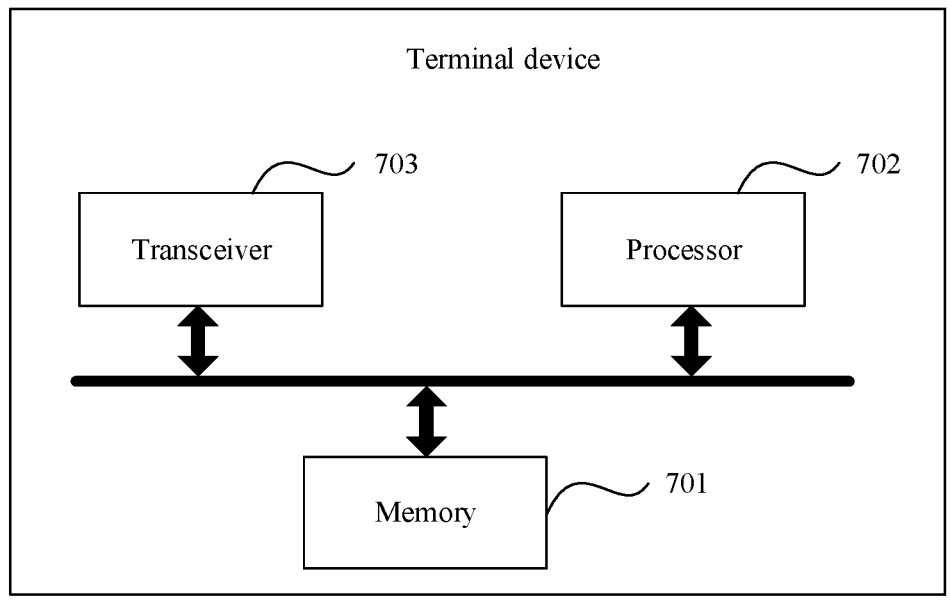
FIG. 7 is a schematic structural diagram of a terminal device according to an embodiment of this application.

FIG. 7 is a schematic structural diagram of a terminal device according to an embodiment of this application. As shown in FIG. 7, the terminal device includes one or more processors 702, one or more memories 701, and one or more transceivers 703. The processor 702 is configured to control the transceiver 703 to receive and send a signal, the memory 701 is configured to store a computer program, and the processor 702 is configured to: invoke the computer program from the memory 701 and run the computer program, to perform a corresponding procedure and/or operation performed by the terminal device in the method for notifying information about a power difference and/or the CSI feedback method and the embodiments thereof in this application. For brevity, details are not described herein.

Optionally, the processor 702, the memory 701, and the transceiver 703 may be connected through a bus.

For example, the terminal device may be the terminal device in the wireless communications system shown in FIG. 1. For example, the processor 702 may correspond to the processing unit 502 in FIG. 5, and the transceiver 703 may correspond to the communications unit 501 shown in FIG. 5.

Figure 8:
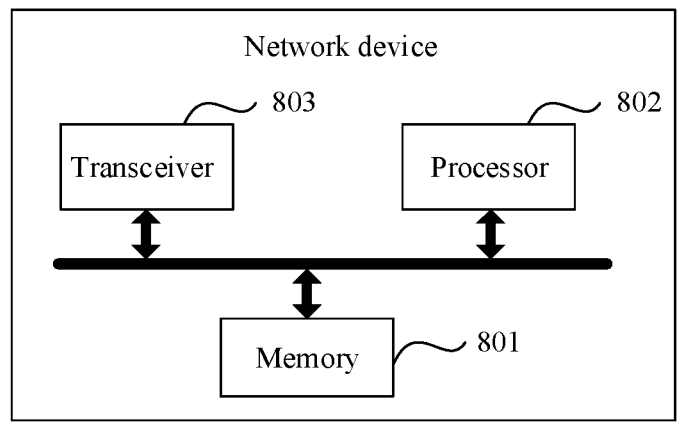
FIG. 8 is a schematic structural diagram of a network device according to an embodiment of this application.

FIG. 8 is a schematic structural diagram of a network device according to an embodiment of this application. As shown in FIG. 8, the network device may be applied to the wireless communications system shown in FIG. 1, to perform a function of the network device in the embodiment of the method for notifying information about a power difference provided in this application.

As shown in FIG. 8, the network device includes one or more processors 802, one or more memories 801, and one or more transceivers 803. The processor 802 is configured to control the transceiver 803 to receive and send a signal, the memory 801 is configured to store a computer program, and the processor 802 is configured to: invoke the computer program from the memory 801 and run the computer program, to perform a corresponding procedure and/or operation performed by the terminal device in the method for notifying information about a power difference and/or the CSI feedback method and the embodiments thereof in this application. For brevity, details are not described herein.

Optionally, the processor 802, the memory 801, and the transceiver 803 may be connected through a bus.

In addition, this application provides a computer-readable storage medium. The computer-readable storage medium stores computer instructions. When the computer instructions are run on a computer, the computer is enabled to perform a corresponding operation and/or procedure performed by the terminal device in the method for notifying information about a power difference and/or the CSI feedback method in the embodiments of this application; or the computer is enabled to perform a corresponding operation and/or procedure performed by the network device in the method for notifying information about a power difference and/or the CSI feedback method in the embodiments of this application.

This application further provides a computer program product. The computer program product includes computer program code. When the computer program code is run on a computer, the computer is enabled to perform a corresponding operation and/or procedure performed by the terminal device in the method for notifying information about a power difference and/or the CSI feedback method in the embodiments of this application; or the computer is enabled to perform a corresponding operation and/or procedure performed by the network device in the method for notifying information about a power difference and/or the CSI feedback method in the embodiments of this application.

This application further provides a chip, including a processor. The processor is configured to invoke and run a computer program stored in a memory, to perform a corresponding operation and/or procedure performed by the terminal device in the method for notifying information about a power difference and/or the CSI feedback method in the embodiments of this application, or to perform a corresponding operation and/or procedure performed by the network device in the method for notifying information about a power difference and/or the CSI feedback method in the embodiments of this application. Optionally, the chip further includes the memory, the memory and the processor are connected through a circuit or a wire, and the processor is configured to read and execute a computer program in the memory. Further, optionally, the chip further includes a communications interface, and the processor is connected to the communications interface. The communications interface is configured to receive data and/or information that need/needs to be processed. The processor obtains the data and/or information from the communications interface, and processes the data and/or information. The communications interface may be an input/output interface.

Figure 9:
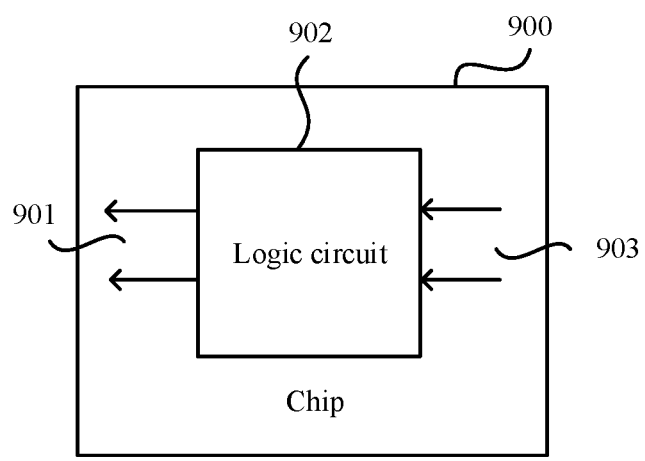
FIG. 9 is a schematic structural diagram of a chip according to an embodiment of this application.

As shown in FIG. 9, this application further provides a chip 900. The chip is located in a network device and includes: a logic circuit 902, configured to determine first information, where the first information is used to indicate a first power difference; the first power difference is related to a first waveform, and the first power difference is an offset between a power of a reference signal and a power of a first physical downlink shared channel (PDSCH) on which the first waveform is used; and an output port 901, configured to output the first information. The chip enables the network device to perform a corresponding operation and/or procedure performed by the network device in the method for notifying information about a power difference in the embodiments of this application.

Optionally, the output port 901 is further configured to output and send second information. The second information is used to indicate waveform information corresponding to channel state information (CSI) that needs to be reported by a terminal device.

Optionally, the chip further includes an input port 903, further configured to input request information from the terminal device. The request information is used to request the network device to indicate the waveform information corresponding to the CSI that needs to be reported by the terminal device.

Optionally, the input port 903 is further configured to input third information from the terminal device. The third information is used to indicate waveform information corresponding to CSI to be reported by the terminal device.

Optionally, if the reference signal is a channel state information reference signal, the input port 903 is further configured to input the CSI sent by the terminal device. The CSI is determined based on the first power difference.

This application further provides a chip. For a schematic structural diagram of the chip, refer to FIG. 9. The chip is located in a terminal device and includes: an input port, configured to input first information from a network device, where the first information is used to indicate a first power difference, the first power difference is related to a first waveform, and the first power difference is an offset between a power of a reference signal and a power of a first physical downlink shared channel (PDSCH) on which the first waveform is used; and a logic circuit, configured to obtain the first power difference. The chip enables the terminal device to perform a corresponding operation and/or procedure performed by the terminal device in the method for notifying information about a power difference in the embodiments of this application.

Optionally, the input port is configured to input second information from the network device. The second information is used to indicate waveform information corresponding to CSI that needs to be reported by the terminal device.

Optionally, the chip further includes an output port, configured to output request information. The request information is used to request the network device to indicate the waveform information corresponding to the CSI that needs to be reported by the terminal device.

Optionally, the output port is configured to output third information. The third information is used to indicate waveform information corresponding to CSI to be reported by the terminal device.

Optionally, if the reference signal is a channel state information reference signal, the logic circuit is configured to determine the CSI based on the first power difference; and the output port is further configured to output the CSI.

For related limitations on parameters such as the first information and a waveform, refer to the foregoing descriptions. Details are not described herein again.

This application further provides a chip. For a schematic structural diagram of the chip, refer to FIG. 9. The chip is located in a network device and includes: an input port, configured to input CSI from a terminal device; and a logic circuit, configured to determine waveform information corresponding to the CSI. The chip enables the network device to perform a corresponding operation and/or procedure performed by the network device in the CSI feedback method in the embodiments of this application.

Optionally, the processing unit is configured to determine second information. The second information is used to indicate waveform information corresponding to channel state information (CSI) that needs to be reported by the terminal device, and the waveform information corresponding to the CSI is the second information.

Optionally, the chip further includes an output port, configured to output the second information.

Optionally, the input port is further configured to input request information from the terminal device. The request information is used to request the network device to indicate the waveform information corresponding to the CSI that needs to be reported by the terminal device.

Optionally, the input port is further configured to input third information from the terminal device. The third information is used to indicate waveform information corresponding to CSI to be reported by the terminal device.

This application provides a chip. For a schematic structural diagram of the chip, refer to FIG. 9. The chip is located in a terminal device and includes: a logic circuit, configured to determine waveform information corresponding to CSI that needs to be reported by the terminal device and the CSI; and an output port, configured to output the CSI. The chip enables the terminal device to perform a corresponding operation and/or procedure performed by the terminal device in the CSI feedback method in the embodiments of this application.

Optionally, the chip further includes an input port, further configured to input second information from a network device. The logic circuit is configured to determine, based on the second information, the waveform information corresponding to the CSI that needs to be reported. The second information is used to indicate the waveform information corresponding to the channel state information (CSI) that needs to be reported by the terminal device.

Optionally, the output port is further configured to output request information. The request information is used to request the network device to send the second information.

Optionally, the output port is further configured to output third information. The third information is used to indicate waveform information corresponding to CSI to be reported by the terminal device.

In the foregoing embodiments, a processor may be a central processing unit (CPU), a microprocessor, an application-specific integrated circuit (ASIC), one or more integrated circuits that are configured to control program execution in the technical solutions of this application, or the like. For example, the processor may be a digital signal processor device, a microprocessor device, an analog-to-digital converter, a digital-to-analog converter, or the like. The processor may allocate control and signal processing functions of a terminal device or a network device to the devices based on respective functions of the devices. In addition, the processor may have a function of operating one or more software programs, and the software program may be stored in a memory. The function of the processor may be implemented by hardware, or may be implemented by hardware by executing corresponding software. The hardware or software includes one or more modules corresponding to the foregoing functions.

The memory may be a read-only memory (ROM), another type of static storage device that may store static information and instructions, a random access memory (RAM), or another type of dynamic storage device that may store information and instructions, or may be an electrically erasable programmable read-only memory (EEPROM), a compact disc read-only memory (CD-ROM) or other optical disk storage, optical disk storage (including a compressed optical disc, a laser disc, an optical disc, a digital versatile optical disc, and a Blu-ray disc), a magnetic disk storage medium, or another magnetic storage device, or may be any other medium that can be used to carry or store desired program code in the form of an instruction or a data structure and that can be accessed by a computer.

Optionally, the memory and the processor in the foregoing embodiments may be units that are physically independent of each other, or the memory may be integrated with the processor.

In the embodiments of this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. Herein, A and B may be in the singular or in the plural. The character "l" usually indicates an "or" relationship between the associated objects. "At least one of the following items" and similar expressions mean any combination of the items, including any combination of a single item or a plurality of items. For example, at least one of a, b, and c may represent a, b, c, a-b, a-c, b-c, or a-b-c. Herein, a, b, and c may be in the singular or in the plural.

A person of ordinary skill in the art may be aware that the units and algorithm steps described in the embodiments disclosed in this specification can be implemented by using a combination of electronic hardware, computer software, and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiments are merely examples. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may not be physically separate, and parts displayed as units may not be physical units, may be located in one position, or may be distributed on a plurality of network units. Some or all of the units may be selected based on an actual requirement to achieve the objectives of the technical solutions of this application.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network device, comprising:
a transceiver; and
one or more processors in communication with the transceiver and to a non-transitory memory storage, wherein the one or more processors execute computer-executable instructions of the non-transitory memory storage to cause the one or more processors to perform operations comprising:
   determining first information, wherein:
      the first information is used to indicate a first power difference, the first power difference is associated with a first waveform, and the first power difference comprises an offset between a power of a reference signal and a power of a first physical downlink shared channel (PDSCH) on which the first waveform is used; and
      the first information is used to indicate a plurality of power differences, and at least two of the plurality of power differences correspond to different waveforms; and
   sending, by the transceiver, the first information to a terminal device.

2. The network device according to claim 1, wherein the first waveform comprises a single-carrier waveform or a multi-carrier waveform.

3. The network device according to claim 1, wherein the operations further comprise:
   sending, by the transceiver, second information to the terminal device, wherein the second information is used to indicate waveform information corresponding to channel state information (CSI) to be reported by the terminal device; or
   receiving, by the transceiver, third information from the terminal device, wherein the third information is used to indicate the waveform information corresponding to the CSI to be reported by the terminal device.

4. The network device according to claim 1, wherein the operations further comprise:
   receiving, by the transceiver, channel state information (CSI) from the terminal device, wherein the CSI is determined based on the first power difference.

5. The network device according to claim 1, wherein the operations further comprise:
   performing, by the transceiver, downlink transmission based on the first power difference.

6. A terminal device, comprising:
a transceiver; and
one or more processors in communication with the transceiver and to a non-transitory memory storage, wherein the one or more processors execute computer-executable instructions of the non-transitory memory storage to cause the one or more processors to perform operations comprising:
   receiving, by the transceiver, first information from a network device, wherein:
      the first information is used to indicate a first power difference, the first power difference is associated with a first waveform, and the first power difference comprises an offset between a power of a reference signal and a power of a first physical downlink shared channel (PDSCH) on which the first waveform is used; and
      the first information is used to indicate a plurality of power differences, and at least two of the plurality of power differences correspond to different waveforms; and
   obtaining the first power difference.

7. The terminal device according to claim 6, wherein the first waveform comprises a single-carrier waveform or a multi-carrier waveform.

8. The terminal device according to claim 6, wherein the operations further comprise:
   receiving, by the transceiver, second information from the network device, wherein the second information is used to indicate waveform information corresponding to channel state information (CSI) to be reported by the terminal device; or
   sending, by the transceiver, third information to the network device, wherein the third information is used to indicate the waveform information corresponding to the CSI to be reported by the terminal device.

9. The terminal device according to claim 6, wherein the operations further comprise:
   determining channel state information (CSI) based on the first power difference; and
   sending, by the transceiver, the CSI to the network device.

10. The terminal device according to claim 6, wherein the operations further comprise:
   receiving, by the transceiver and based on the first power difference, downlink transmission from the network device.

11. The terminal device according to claim 6, wherein:
   if the first waveform comprises a single-carrier waveform, the first power difference is associated with the first waveform and a first modulation scheme, and the first power difference comprises an offset between the power of the reference signal and a power of a first PDSCH on which the first waveform and the first modulation scheme are used.

12. The terminal device according to claim 6, wherein:
   the first information comprises information about a second power difference and information about a third power difference, the second power difference is associated with a second waveform, the second power difference comprises an offset between the power of the reference signal and a power of a second PDSCH on which the second waveform is used, the third power difference comprises an offset between the power of the first PDSCH and the power of the second PDSCH, and the first power difference is determined based on the second power difference and the third power difference.

13. The terminal device according to claim 6, wherein:
   the first information comprises information about a second power difference, the second power difference is associated with a second waveform, the second power difference comprises an offset between the power of the reference signal and a power of a second PDSCH on which the second waveform is used, the first power difference is determined based on the second power difference and a third power difference, and the third power difference comprises an offset between the power of the first PDSCH and the power of the second PDSCH.

14. The terminal device according to claim 6, wherein:
   the first information comprises information about a fourth power difference and information about a fifth power difference, the fourth power difference is associated with the first waveform and a second modulation scheme, the fourth power difference comprises an offset between the power of the reference signal and a power of a third PDSCH on which the first waveform and the second modulation scheme are used, the fifth power difference comprises an offset between the power of the first PDSCH and the power of the third PDSCH, and the first power difference is determined based on the fourth power difference and the fifth power difference.

15. The terminal device according to claim 6, wherein:
the first information comprises information about a fourth power difference, the fourth power difference is associated with the first waveform and a second modulation scheme, the fourth power difference comprises an offset between the power of the reference signal and a power of a third PDSCH on which the first waveform and the second modulation scheme are used, the first power difference is determined based on the fourth power difference and a fifth power difference, and the fifth power difference comprises an offset between the power of the first PDSCH and the power of the third PDSCH.

16. A method for notifying information about a power difference, comprising:
determining, by a network device, first information, wherein:
the first information is used to indicate a first power difference, the first power difference is associated with a first waveform, and the first power difference comprises an offset between a power of a reference signal and a power of a first physical downlink shared channel (PDSCH) on which the first waveform is used; and
the first information is used to indicate a plurality of power differences, and at least two of the plurality of power differences correspond to different waveforms; and
sending, by the network device, the first information to a terminal device.

17. The method according to claim 16, wherein the method further comprises:
sending, by the network device, second information to the terminal device, wherein the second information is used to indicate waveform information corresponding to channel state information (CSI) to be reported by the terminal device; or
receiving, by the network device, third information from the terminal device, wherein the third information is used to indicate the waveform information corresponding to the CSI to be reported by the terminal device.

18. A method for notifying information about a power difference, comprising:
receiving, by a terminal device, first information from a network device, wherein:
the first information is used to indicate a first power difference, the first power difference is related to a first waveform, and the first power difference is an offset between a power of a reference signal and a power of a first physical downlink shared channel PDSCH on which the first waveform is used; and the first information is used to indicate a plurality of power differences, and at least two of the plurality of power differences correspond to different waveforms; and
obtaining, by the terminal device, the first power difference.

19. The method according to claim 18, wherein the first waveform comprises a single-carrier waveform or a multi-carrier waveform.

20. The method according to claim 18, wherein the method further comprises:
receiving, by the terminal device, second information from the network device, wherein the second information is used to indicate waveform information corresponding to CSI that needs to be reported by the terminal device; or sending, by the terminal device, third information to the network device, wherein the third information is used to indicate waveform information corresponding to CSI to be reported by the terminal device.

\* \* \* \* \*